United States Patent
Yun et al.

(10) Patent No.: US 9,921,423 B2
(45) Date of Patent: Mar. 20, 2018

(54) LIQUID CRYSTAL DISPLAY

(71) Applicant: Samsung Display Co., Ltd., Yongin, Gyeonggi-Do (KR)

(72) Inventors: Sung-Jae Yun, Hwaseong-si (KR); Heung Shik Park, Seoul (KR); Oh Jeong Kwon, Hwaseong-si (KR); Ki Chul Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/805,240

(22) Filed: Jul. 21, 2015

(65) Prior Publication Data

US 2016/0097957 A1    Apr. 7, 2016

(30) Foreign Application Priority Data

Oct. 7, 2014  (KR) .................. 10-2014-0135094

(51) Int. Cl.
| | |
|---|---|
| *G02F 1/1343* | (2006.01) |
| *G02F 1/1333* | (2006.01) |
| *G02F 1/1337* | (2006.01) |
| *G02F 1/1362* | (2006.01) |
| *G02F 1/136* | (2006.01) |

(52) U.S. Cl.
CPC ...... *G02F 1/133371* (2013.01); *G02F 1/1362* (2013.01); *G02F 1/133707* (2013.01); *G02F 1/134336* (2013.01); *G02F 2001/13606* (2013.01); *G02F 2001/133357* (2013.01)

(58) Field of Classification Search
CPC ......... G02F 1/134363; G02F 1/134309; G02F 1/13371; G02F 1/133707; G02F 1/134336; G02F 1/1362
See application file for complete search history.

(56) References Cited

U.S. PATENT DOCUMENTS

| | | | | |
|---|---|---|---|---|
| 2012/0280236 A1* | 11/2012 | Kim | ............ | G02F 1/1362 257/59 |
| 2015/0098047 A1* | 4/2015 | Shin | .............. | G02F 1/133707 349/106 |

FOREIGN PATENT DOCUMENTS

KR    10-2013-0091861 A    8/2013

* cited by examiner

*Primary Examiner* — James Dudek
(74) *Attorney, Agent, or Firm* — Innovation Counsel LLP

(57) ABSTRACT

A liquid crystal display according to an exemplary embodiment of the present system and method includes: a first substrate; a thin film transistor disposed on the first substrate; a passivation layer disposed on the thin film transistor and including a first portion and a second portion thicker than the first portion; a first sub-pixel electrode and a second sub-pixel electrode disposed on the passivation layer, spaced apart from each other, and positioned on one pixel region; a second substrate facing the first substrate; and a liquid crystal layer positioned between the first substrate and the second substrate, wherein the first sub-pixel electrode is disposed on the second portion of the passivation layer, and the second sub-pixel electrode is disposed on the first portion of the passivation layer.

10 Claims, 9 Drawing Sheets

LIQUID CRYSTAL DISPLAY

CROSS-REFERENCE TO RELATED APPLICATION

This application claims priority to and the benefit of Korean Patent Application No. 10-2014-0135094 filed in the Korean Intellectual Property Office on Oct. 7, 2014, the entire contents of which are incorporated herein by reference.

BACKGROUND

(a) Related Field

The present system and method relate to a liquid crystal display.

(b) Description of the Related Art

A liquid crystal display, which is a type of flat panel display, includes two sheets of display panels on which electric field generating electrodes such as pixel electrodes, common electrodes, and the like are disposed, and a liquid crystal layer interposed between the two sheets of display panels.

The liquid crystal display generally displays an image by applying a voltage to the electric field generating electrodes to generate an electric field in the liquid crystal layer. The generated electric field determines the alignment of the liquid crystal molecules in the liquid crystal layer, and thereby determines the polarization of the incident light transmitted by the liquid crystal layer.

The liquid crystal display also generally includes switching elements connected to the respective pixel electrodes, and a plurality of signal lines such as gate lines, data lines, and the like. By controlling the switching elements, data voltages may be selectively applied to the pixel electrodes.

The liquid crystal display may be configured in a vertically aligned mode in which a major axis of the liquid crystal molecule is arranged to be vertical to the display panel. When configured in the vertically aligned mode, the liquid crystal display has a large contrast ratio and a wide reference viewing angle. Here, the reference viewing angle refers to a viewing angle having the contrast ratio of 1:10 or a brightness reversion limit angle between gradations.

A method in which each pixel is formed as two sub-pixels has been proposed for a vertically aligned display. The method allows each pixel to display two different transmittances concurrently when different voltages are applied to the two sub-pixels. Thus, such a configuration would allow the side visibility of the display to more closely approximate the front visibility. However, applying different voltages to the sub-pixels may have difficulties in terms of processes.

SUMMARY

The present system and method have provide a liquid crystal display that prevents or otherwise reduces transmittance degradation while approximating the side visibility of the display to the front visibility of the same.

In addition, the present system and method provide a method for manufacturing a liquid crystal display that allows the liquid crystal molecules to have pre-tilt angles.

An exemplary embodiment of the present system and method provides a liquid crystal display including: a first substrate; a thin film transistor disposed on the first substrate; a passivation layer disposed on the thin film transistor and including a first portion and a second portion thicker than the first portion; a first sub-pixel electrode and a second sub-pixel electrode disposed on the passivation layer, spaced apart from each other, and positioned on one pixel region; a second substrate facing the first substrate; and a liquid crystal layer positioned between the first substrate and the second substrate, wherein the first sub-pixel electrode is disposed on the second portion of the passivation layer, and the second sub-pixel electrode is disposed on the first portion of the passivation layer.

The second portion of the passivation layer may be thicker than the first portion of the passivation layer by 5000 Å to 10000 Å.

The second portion of the passivation layer may have an overall polygonal shape of a hexagon, or the like, and the first portion of the passivation layer may surround the second portion of the passivation layer.

The first sub-pixel electrode may include a plurality of first branch electrodes, the second sub-pixel electrode may include a plurality of second branch electrodes, and the second sub-pixel electrode may be positioned at a border of the pixel region so as to surround the first sub-pixel electrode.

The first sub-pixel electrode and the second sub-pixel electrode may be spaced apart a distance of 3 µm to 4 µm.

The distance between the first sub-pixel electrode and the second sub-pixel electrode may be 3.0 µm, and a ratio of the voltage applied to the second sub-pixel electrode to the voltage applied to the first sub-pixel electrode may be 0.9 or less.

The distance between the first sub-pixel electrode and the second sub-pixel electrode may be 4.0 µm, and a ratio of the voltage applied to the second sub-pixel electrode to the voltage applied to the first sub-pixel electrode may be 0.8 or less.

The first sub-pixel electrode may have an overall polygonal shape of a hexagon, or the like, and the second sub-pixel electrode may have an overall shape in which four parallelograms are clustered.

The first sub-pixel electrode may further include a cross stem portion including a horizontal stem portion and a vertical stem portion, and the plurality of first branch electrodes may extend in four different directions from the cross stem portion.

The second sub-pixel electrode may further include a border stem portion positioned at a border of the pixel region, and the plurality of second branch electrodes may extend in four different directions from the border stem portion.

The liquid crystal display may further include a common electrode disposed on the second substrate.

Another embodiment of the present system and method provides a method for manufacturing a liquid crystal display including: forming a thin film transistor on a first substrate; forming a passivation layer including a first portion and a second portion thicker than the first portion on the thin film transistor; forming a pixel electrode including a first sub-pixel electrode and a second sub-pixel electrode spaced apart from each other and positioned on one pixel region on the passivation layer; bonding the first substrate and a second substrate; after the bonding, injecting a liquid crystal material between the first substrate and the second substrate; applying the same voltage to the first sub-pixel electrode and the second sub-pixel electrode, and irradiating light on the liquid crystal material, wherein the first sub-pixel electrode is formed on the second portion of the passivation layer, and the second sub-pixel electrode is formed on the first portion of the passivation layer.

The method may further include forming a common electrode on the second substrate, wherein the applying of the same voltage to the first sub-pixel electrode and the second sub-pixel electrode includes applying a common voltage to the common electrode.

According to an embodiment of the present system and method, the liquid crystal display prevents or otherwise reduces transmittance degradation while approximating side visibility to front visibility.

In addition, because the same voltage is applied to the first sub-pixel electrode and the second sub-pixel electrode when orienting the liquid crystal molecule to have pre-tilt angles, the process may be facilitated.

DETAILED DESCRIPTION OF THE EMBODIMENTS

Figure 1:
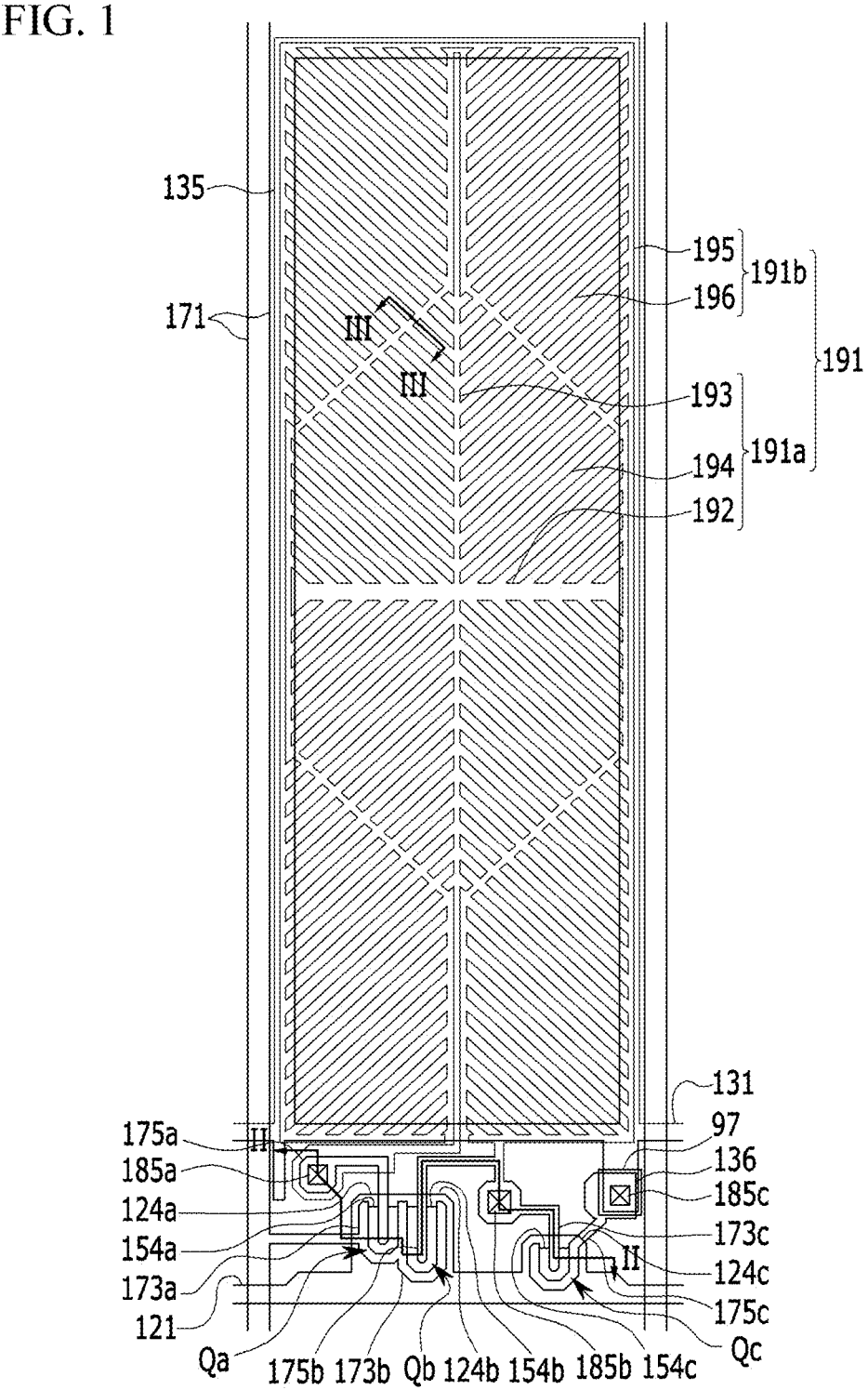
FIG. 1 is a layout view of a liquid crystal display according to an exemplary embodiment of the present system and method.

Exemplary embodiments of the present system and method are described herein with reference to the accompanying drawings. However, the present system and method are not limited to these exemplary embodiments, and may be modified in various different ways. Rather, the exemplary embodiments of the present system and method described below are provided to facilitate the understanding of those of ordinary skill in the art to which the present system and method pertain.

In the drawings, thicknesses of layers and regions are exaggerated for clarity. In addition, if a first layer is described as being 'on' a second layer or substrate, the layer may be directly disposed on the second layer or substrate, or an intervening layer may be present between the first layer and the second layer/substrate. Like reference numerals refer to like elements throughout the specification.

Figure 2:
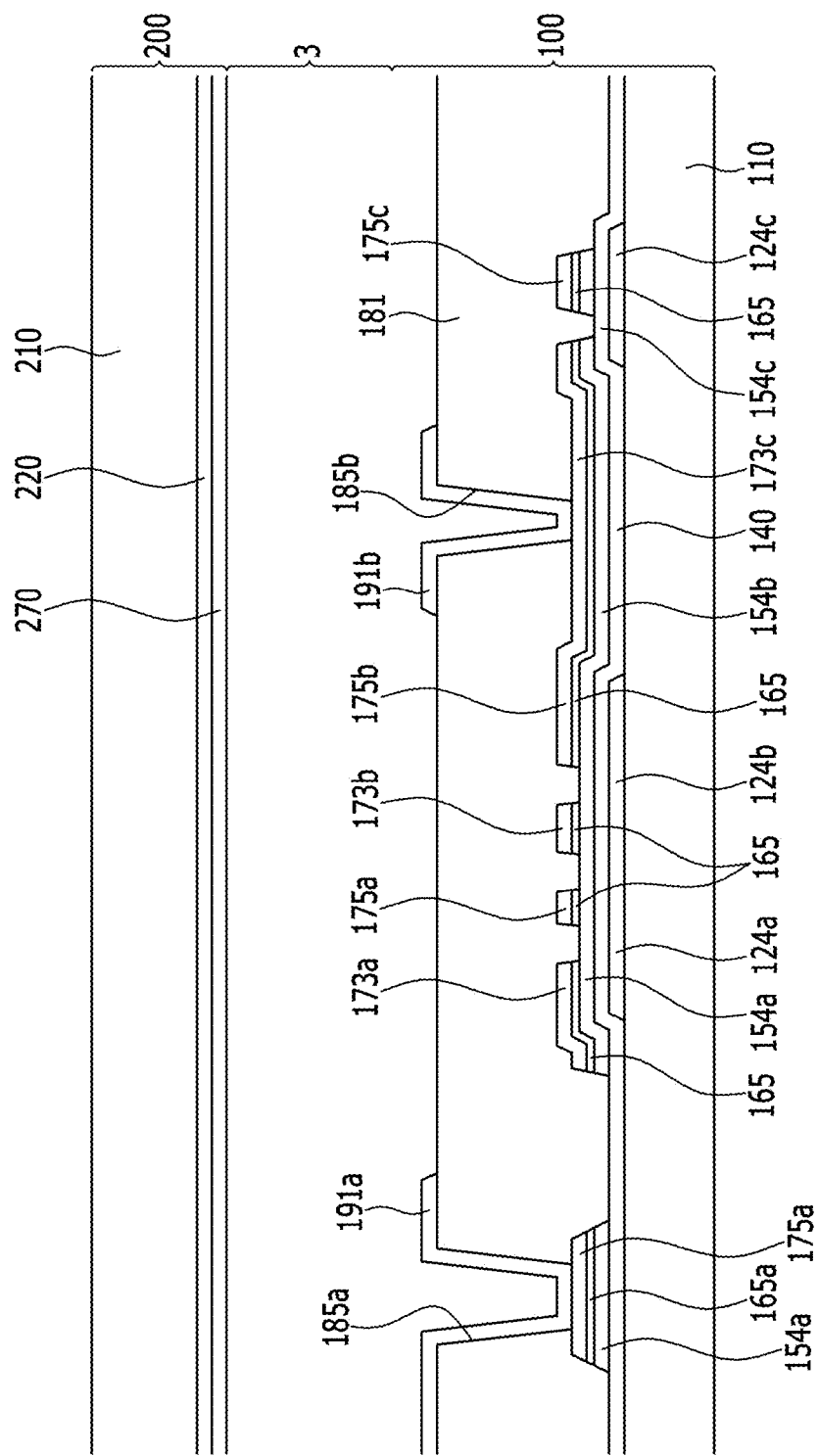
FIG. 2 is a cross-sectional view taken along line II-II of the liquid crystal display of FIG. 1.
Figure 3:
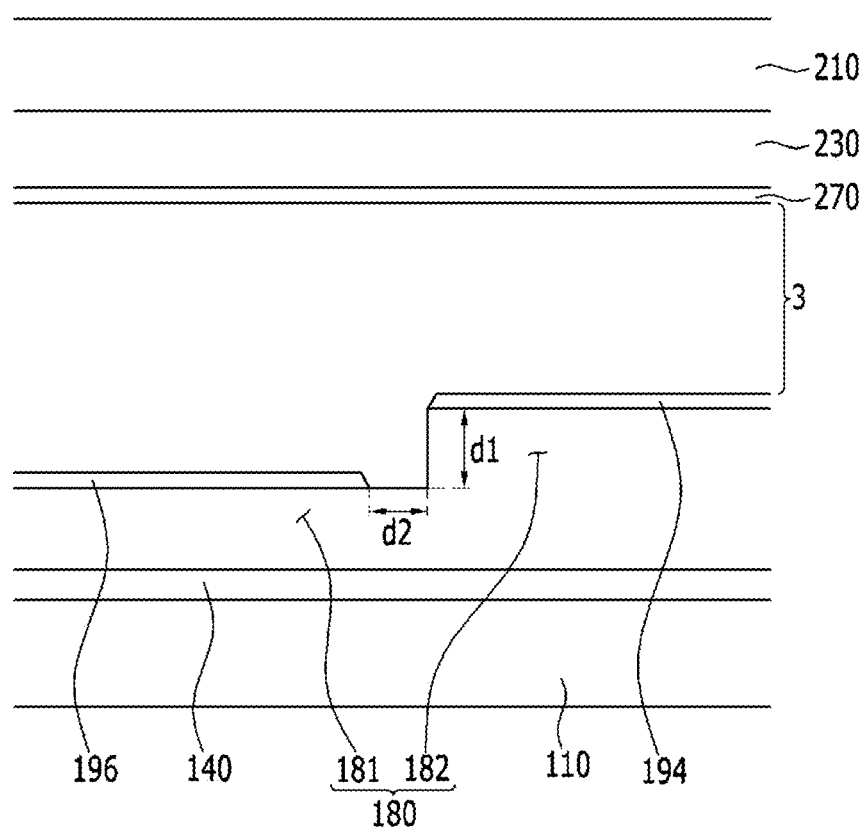
FIG. 3 is a cross-sectional view taken along line of the liquid crystal display of FIG. 1.

First, a liquid crystal display according to an exemplary embodiment of the present system and method is described with reference to FIG. 1, FIG. 2, and FIG. 3. FIG. 1 is a layout view of a liquid crystal display according to an exemplary embodiment of the present system and method. FIG. 2 is a cross-sectional view taken along line II-II of the liquid crystal display of FIG. 1. FIG. 3 is a cross-sectional view taken along line III-III of the liquid crystal display of FIG. 1.

Referring to FIG. 1, FIG. 2, and FIG. 3, the liquid crystal display includes a first display panel 100 and a second display panel 200 that face each other, and a liquid crystal layer 3 interposed between the first and second display panels 100 and 200.

First, the first display panel 100 is described.

A gate line 121, a reference voltage line 131, and a sustain electrode 135 are disposed on a first substrate 110 formed of transparent glass, plastic, or the like. The gate line 121 extends lengthwise in a lateral direction (based on orientation show in FIG. 1) and transfers a gate signal.

The gate line 121 includes a first gate electrode 124a, a second gate electrode 124b, a third gate electrode 124c, and a wide end portion (not shown) that may connect with other layers or external driving circuits.

The reference voltage line 131 may extend lengthwise in parallel with the gate line 121 and have a protruding part 136 that is connected to a third drain electrode 175c (further described below). The reference voltage line 131 includes the sustain electrode 135 surrounding a pixel region.

A gate insulating film 140 is disposed on the gate line 121, the reference voltage line 131, and the sustain electrode 135.

A first semiconductor 154a, a second semiconductor 154b, and a third semiconductor 154c, which may be formed of amorphous or crystalline silicon, or the like, are disposed on the gate insulating film 140.

A plurality of ohmic contacts 165 are disposed on the first semiconductor 154a, the second semiconductor 154b, and the third semiconductor 154c. In the case in which the semiconductors 154a, 154b, and 154c are oxide semiconductor, the ohmic contacts may be omitted.

Data conductors 171, 173a, 173b, 173c, 175a, 175b, and 175c—including a date line 171, a first source electrode 173a, a second source electrode 173b, a third source electrode 173c, a first drain electrode 175a, a second drain electrode 175b, and a third drain electrode 175c—are disposed on the ohmic contacts 165 and the gate insulating film 140. The second drain electrode 175b is connected to the third source electrode 173c.

The first gate electrode 124a, the first source electrode 173a, and the first drain electrode 175a form a first thin film transistor Qa together with the first semiconductor 154a. A channel of the first thin film transistor Qa is formed in a portion of the first semiconductor 154a between the first source electrode 173a and the first drain electrode 175a.

The second gate electrode 124b, the second source electrode 173b, and the second drain electrode 175b form a second thin film transistor Qb together with the second semiconductor 154b. A channel of the second thin film transistor Qb is formed in a portion of the second semiconductor 154b between the second source electrode 173b and the second drain electrode 175b.

The third gate electrode 124c, the third source electrode 173c, and the third drain electrode 175c form a third thin film transistor Qc together with the third semiconductor 154c. A channel of the third thin film transistor Qc is formed in a portion of the third semiconductor 154c between the third source electrode 173c and the third drain electrode 175c.

A passivation layer 180, which may be formed of an inorganic insulating material such as silicon nitride, silicon oxide, or the like, is disposed on the data conductors 171, 173a, 173b, 173c, 175a, 175b, and 175c, and on the exposed portions (e.g., the channel regions) of the semiconductors 154a, 154b, and 154c.

The passivation layer 180 includes a first portion 181 and a second portion 182. The second portion 182 has a thickness thicker than that of the first portion 181. The difference d1 between the thicknesses of the second portion 182 and the first portion 181 may be 5000 Å to 10000 Å, but is not limited thereto.

A pixel electrode 191 including a first sub-pixel electrode 191a and a second sub-pixel electrode 191b, which are spaced apart from each other, is disposed on the passivation layer 180. Here, the first sub-pixel electrode 191a is disposed on the second portion 182 of the passivation layer 180, and the second sub-pixel electrode 191b is disposed on the first portion 181 of the passivation layer 180. The second portion 182 of the passivation layer 180 is positioned below the first sub-pixel electrode 191a. Similarly, the first portion 181 of the passivation layer 180 is positioned below the second sub-pixel electrode 191b. A connecting member 97, which is spaced apart from the pixel electrode 191, is disposed on the passivation layer 180.

Referring to FIG. 1, the first sub-pixel electrode 191a has an overall polygonal shape such as a hexagon, or the like, and the first sub-pixel electrode 191a is surrounded by the second sub-pixel electrode 191b. The second sub-pixel electrode 191b has an overall shape in which four parallelograms are clustered, and is positioned in the peripheral regions of a pixel region to surround the first sub-pixel electrode 191a. As such, the second portion 182 of the passivation layer 180 on which the first sub-pixel electrode 191a is positioned also has an overall polygonal shape such as a hexagon, or the like, and is surrounded by the first portion 181 of the passivation layer 180.

The first sub-pixel electrode 191a includes cross stem portions—a horizontal stem portion 192 and a vertical stem portion 193—and a plurality of first branch electrodes 194 that extend from the cross stem portions 192 and 193. The first branch electrodes 194 extend lengthwise in four different directions. More specifically, the first branch electrodes 194 include a plurality of first fine branch portions that extend obliquely in a left upper direction (based on orientation of FIG. 1), a plurality of second fine branch portions that extend obliquely in a right upper direction, a plurality of third fine branch portions that extend obliquely a left lower direction, and a plurality of fourth fine branch portions that extend obliquely in a right lower direction from the cross stem portions 192 and 193.

The second sub-pixel electrode 191b includes a border stem portion 195 disposed near the edges of the pixel region to surround the pixel region, and a plurality of second branch electrodes 196 that extend from the border stem portion 195. The second branch electrodes 196 extend lengthwise in four different directions. More specifically, the second branch electrodes 196 include a plurality of fifth fine branch portions that extend obliquely in a left upper direction, a plurality of sixth fine branch portions that extend obliquely in a right upper direction, a plurality of seventh fine branch portions that extend obliquely in a left lower direction, and a plurality of eighth fine branch portions that extend obliquely in a right lower direction from the border stem portion 195.

Each of the first branch electrodes 194 is aligned with but spaced apart from a corresponding one of the second branch electrodes 196. An aligned pair of first branch electrode 194 and second branch electrode are herein referred to as being adjacent to one another. The distance d2 (see FIG. 3) between the ends of a first branch electrode 194 and an adjacent second branch electrode 196 that face each other may be 3 µm to 4 µm. In other words, the distance d2 between the first sub-pixel electrode 191a and the second sub-pixel electrode 191b may be 3 µm to 4 µm.

A first contacting hole 185a exposing a portion of the first drain electrode 175a and a second contacting hole 185b exposing a portion of the second drain electrode 175b are disposed in the passivation layer 180. In addition, a third contacting hole 185c exposing a portion of the third drain electrode 175c and a portion of the expanding part 136 is disposed in the passivation layer 180. The connecting member 97 is disposed on the third drain electrode 175c and the expanding part 136, and is connected to the third drain electrode 175c and the expanding part 136 through the third contacting hole 185c.

The first sub-pixel electrode 191a is physically and electrically connected to the first drain electrode 175a through the first contacting hole 185a. The second sub-pixel electrode 191b is physically and electrically connected to the second drain electrode 175b through the second contacting hole 185b.

The first sub-pixel electrode 191a and the second sub-pixel electrode 191b receive a data voltage from the first drain electrode 175a and the second drain electrode 175b, respectively, through the first contacting hole 185a and the second contacting hole 185b.

Next, the second display panel 200 is described.

A light shielding member 220, a color filter 230, and a common electrode 270 are disposed on a second substrate 210 formed of transparent glass, plastic, or the like. The light shielding member 220 partitions second substrate 210 into regions corresponding to the pixel regions. The color filter 230 is disposed on the regions partitioned by the light shielding member 220. The common electrode 270 is disposed on the light shielding member 220 and the color filter 230.

Although not shown in the figures, the color filter 230 and the common electrode 270 may have a covering film disposed between them. The covering film may serve to prevent defects, such as delamination of the color filter 230, and suppress contamination of the liquid crystal layer 3 by an organic material such as a solvent introduced from the color filter. Otherwise, the defects and contamination of the liquid crystal layer may cause an afterimage to be displayed.

In other embodiments, the light shielding member 220 and the color filter 230 may be positioned on the first display panel 100.

The first and second display panels 100 and 200 may have alignment layers (not shown) disposed on the inner surfaces thereof. The alignment layers may be vertical alignment layers.

The first and second display panels 100 and 200 may have polarizers (not shown) provided on the outer surfaces thereof. The transmission axes of the polarizers may be orthogonal to each other. One of the transmission axes may be in parallel with the gate line 121. According to an embodiment, the polarizer is disposed on only the outer surface of one of the first and second display panels 100 and 200.

Figure 5:
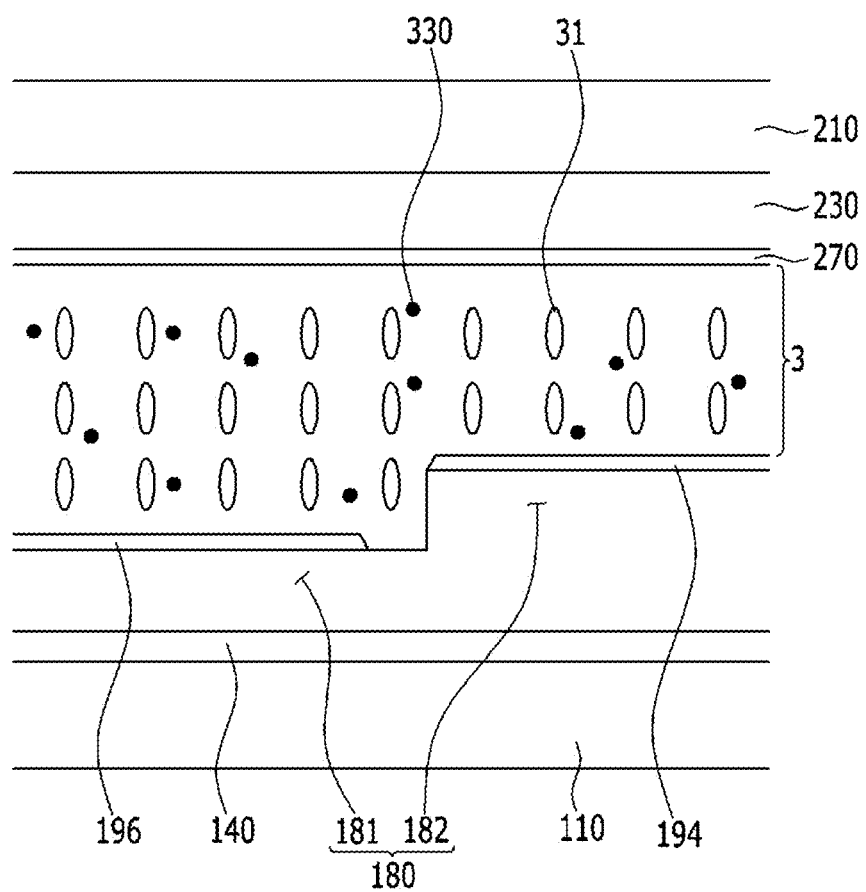
FIG. 5, FIG. 6, and FIG. 7 are diagrams showing a process for orienting the liquid crystal molecules in a liquid crystal display to have pre-tilt angles using prepolymer, which polymerizes in response to light (e.g., ultraviolet rays, and the like), according to an exemplary embodiment of the present system and method.

The liquid crystal layer 3 may have negative dielectric anisotropy, such as shown in FIG. 5. That is, the liquid crystal molecules of the liquid crystal layer 3 may be aligned so that major axes thereof are perpendicular to surfaces of the first and second display panels 100 and 200 when an electric field is not present. Therefore, when no electric field is present, incident light does not pass through the orthogonal polarizer and is blocked.

According to an embodiment, at least one of the liquid crystal layer 3 and the alignment film may contain a light reactive material, more particularly, reactive mesogen.

Figure 4:
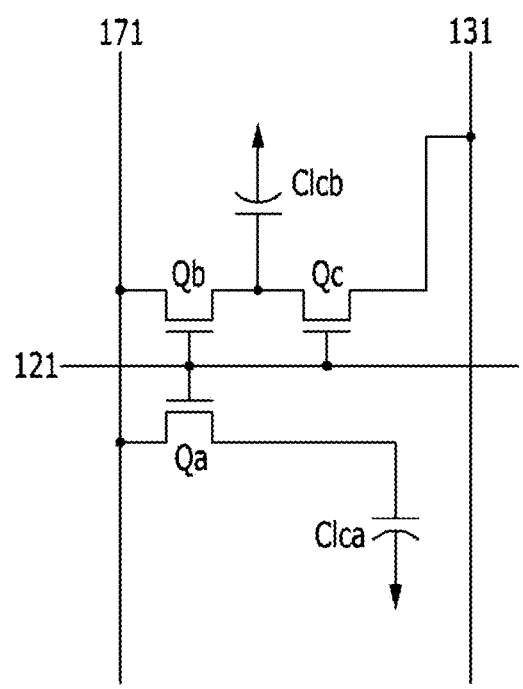
FIG. 4 is a circuit diagram of one pixel of the liquid crystal display according to an exemplary embodiment of the present system and method.

A method for driving a liquid crystal display according to an exemplary embodiment is described with reference to FIGS. 1 and 4. FIG. 4 is a circuit diagram of one pixel of the liquid crystal display according to an exemplary embodiment of the present system and method.

If a gate on signal is applied to the gate line 121, the gate on signal is applied to the first gate electrode 124a, the second gate electrode 124b, and the third gate electrode 124c, thereby turning on a first switching element Qa, a second switching element Qb, and a third switching element Qc. Consequently, the data voltage applied to the data line 171 is applied to the first sub-pixel electrode 191a and the second sub-pixel electrode 191b through the first switching element Qa and the second switching element Qb, respectively, which are turned on.

In this case, the first sub-pixel electrode 191a and the second sub-pixel electrode 191b receive the same level of voltage from the data line 171. However, because the voltage applied to the second sub-pixel electrode 191b is divided by the third switching element Qc, which is connected in series with the second switching element Qb, the voltage applied to the second sub-pixel electrode 191b is smaller than the voltage applied to the first sub-pixel electrode 191a.

Therefore, the charging voltages of a first liquid crystal capacitor Clca formed between the first sub-pixel electrode 191a and the common electrode 270 and a second liquid crystal capacitor Clcb formed between the second sub-pixel electrode 191b and the common electrode 270 exhibit gamma curves that are different from each other. A gamma curve of one pixel voltage is obtained by synthesizing these different gamma curves. A synthesized gamma curve at the front is matched to a reference gamma curve at the front that is defined to be most suitable. Also, a synthesized gamma curve at a side is most approximated to the reference gamma curve at the front. By converting image data as described above, side visibility is improved.

As described above, the distance d2 between the first sub-pixel electrode 191a and the second sub-pixel electrode 191b may be 3 μm to 4 μm.

If the distance d2 between the first sub-pixel electrode 191a and the second sub-pixel electrode 191b is 3.0 μm, a ratio of the voltage applied to the second sub-pixel electrode 191b to the voltage applied to the first sub-pixel electrode 191a may be about 0.9 or less. If the distance d2 between the first sub-pixel electrode 191a and the second sub-pixel electrode 191b is about 4.0 μm, the ratio of the voltage applied to the second sub-pixel electrode 191b to the voltage applied to the first sub-pixel electrode 191a may be about 0.8 or less.

According to a generally known liquid crystal display (not shown), a first sub-pixel electrode and a second sub-pixel electrode are disposed an upper and a lower portion of a pixel region, respectively, and spaced apart from each other. Moreover, each of the first and second sub-pixel electrodes has an approximately quadrangular shape and is formed to have a cross stem portion and a plurality of branch electrodes that extend from the cross stem portion. With such a structure, the transmittance of the liquid crystal display is degraded at a region between the first sub-pixel electrode and the second sub-pixel electrode, and the regions of the cross stem portion of each of the first sub-pixel electrode and the second sub-pixel electrode.

However, in the case of the liquid crystal display according to an exemplary embodiment of the present system and method, the first sub-pixel electrode 191a has an overall polygonal shape such as a hexagon, or the like, and is surrounded by the second sub-pixel electrode 191h, which has an overall shape of four clustered parallelograms and is positioned at an edge of a pixel region.

In addition, the first sub-pixel electrode 191a includes the cross stem portions—the horizontal stem portion 192 and the vertical stem portion 193—and the plurality of first branch electrodes 194 that extend from the cross stem portions 192 and 193. The second sub-pixel electrode 191b includes the border stem portion 195 formed along the borders of the pixel region and the plurality of second branch electrodes 196 that extend from the border stem portion 195. With such a structure, the distance d2 between the first sub-pixel electrode 191a and the second sub-pixel electrode 191b may be relatively narrow. Moreover, unlike the generally known liquid crystal display, no the second sub-pixel electrode 191b does not have a stem portion disposed at a central portion of the pixel region. Instead, the second sub-pixel electrode 191h includes the border stem portion 195 disposed along the borders of the pixel region, and thereby prevents or otherwise reduces transmittance degradation around the cross stem portion.

In addition, because a portion of the vertical stem portion 193 of the first sub-pixel electrode 191a is positioned between the second branch electrodes 196 of the second sub-pixel electrode 191b, as shown in FIG. 1, and the first sub-pixel electrode 191a and the second branch electrodes 196 of the second sub-pixel electrode 191b have different voltages, an electric field is generated between portions of the vertical stem 193 of the first sub-pixel electrode 191a and adjacent second branch electrodes 196 of the second sub-pixel electrode 191b. The electric field causes the liquid crystal molecules positioned around the vertical stem 193 of the first sub-pixel electrode 191a to be tilted in a direction that is almost in parallel with the direction in which the second branch electrodes 196 of the second sub-pixel electrode 191b extend. As a result, transmittance degradation around the vertical stem 193 of the first sub-pixel electrode 191a may be prevented or otherwise reduced.

As such, the liquid crystal display according to an exemplary embodiment of the present system and method prevents or otherwise reduces transmittance degradation of the liquid crystal display, for example, by forming one pixel electrode 191 as the first sub-pixel electrode 191a and the second sub-pixel electrode 191b in the manner shown in FIG. 1.

In addition, because the second sub-pixel electrode 191b is formed along the borders of the pixel region to surround the first sub-pixel electrode 191a, and is applied with a lower voltage than that applied to the first sub-pixel electrode, parasitic capacitance due to an overlap of the data line 171 and the pixel electrode 191 is decreased. More specifically, since parasitic capacitance is proportional to the voltage levels of overlapping two electrodes, parasitic capacitance occurring when the first sub-pixel electrode 191a applied with the relatively high voltage and the data line 171 are overlapped is larger than parasitic capacitance occurring when the second sub-pixel electrode 191b applied with the relatively low voltage and the data line 171 are overlapped.

Therefore, according to the liquid crystal display according to an exemplary embodiment of the present system and method, since the data line 171 is generally overlapped with the second sub-pixel electrode 191b positioned at the border of the pixel region, unnecessary parasitic capacitance due the overlap of the data line 171 and the pixel electrode 191 may be reduced as compared to a case in which the first sub-pixel electrode 191a and the second sub-pixel electrode 191b overlap with the data line 171 at the same area. As such, since the parasitic capacitance is reduced, the second sub-pixel electrode 191b may be formed to have a larger size to increase transmittance of the liquid crystal display.

As described above, at least one of the liquid crystal layer 3 and the alignment film may contain a light reactive material, more particularly, reactive mesogen, according to an embodiment. A method for initially aligning the liquid crystal molecules 31 so as to have pre-tilt angles using the light reactive material is described with reference to FIG. 5, FIG. 6, and FIG. 7.

Figure 6:
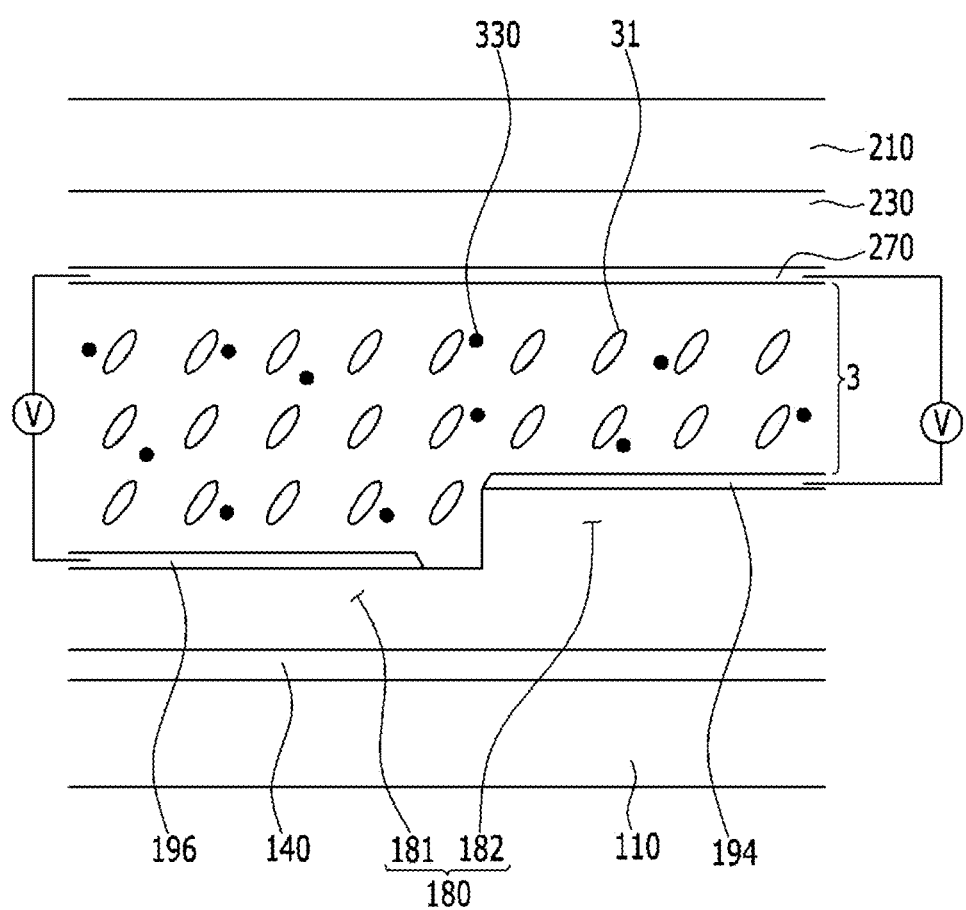
Figure 7:
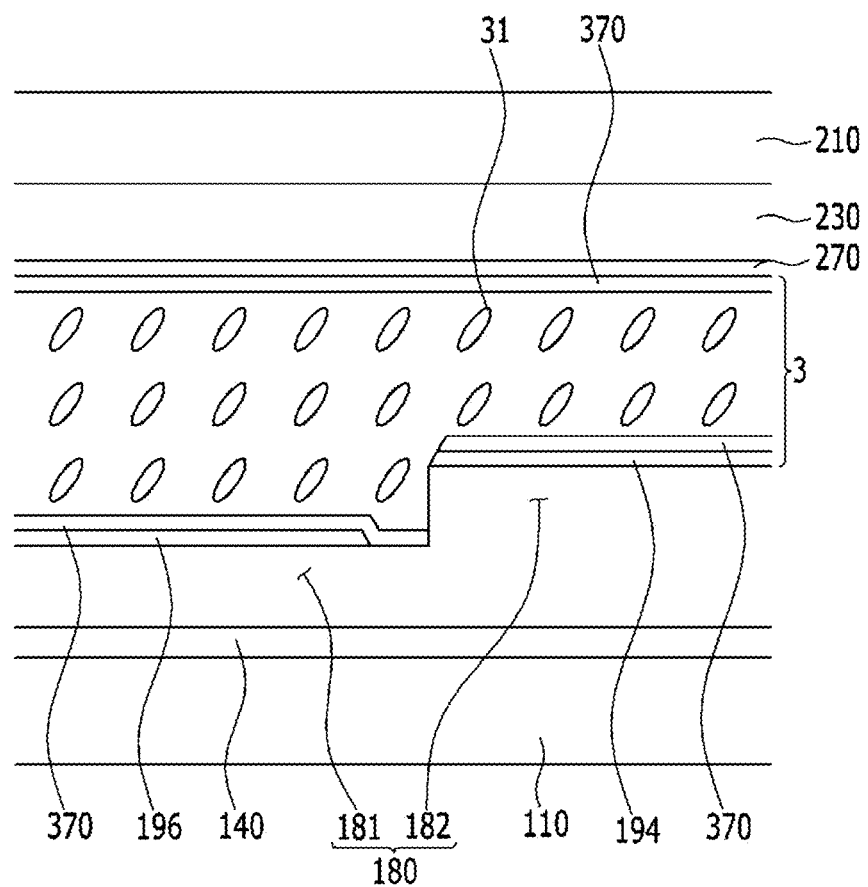

FIG. 5, FIG. 6, and FIG. 7 are diagrams showing a process for orienting the liquid crystal molecules in a liquid crystal display to have pre-tilt angles using prepolymer, which polymerizes in response light (e.g., ultraviolet rays, and the like), according to an exemplary embodiment of the present system and method.

Referring to FIG. 5, a prepolymer 330, such as a monomer that cures by a polymerization in response to light (e.g., ultraviolet rays, or the like), is injected between the first and second display panels 100 and 200. The prepolymer may be injected together with a liquid crystal material. The prepolymer 330 may be a reactive mesogen that polymerizes in response to light (e.g., ultraviolet rays, or the like).

The liquid crystal material (and prepolymer 330) may be injected after the first and second display panels 100 and 200 are bonded, or the first and second display panels 100 and 200 may be bonded after the liquid crystal material is loaded on the first display panel 100 or the second display panel 200.

Referring to FIG. 6, an electric field is generated in the liquid crystal layer 3 between the first and second display panels 100 and 200 by applying a voltage to the first sub-pixel electrode 191a and the second sub-pixel electrode 191b and applying a common voltage to the common electrode 270. In this case, the first sub-pixel electrode 191a and the second sub-pixel electrode 191b are applied with the same voltage. However, the electric field generated between the first sub-pixel electrode 191a and the common electrode 270 has a different strength and distribution than the electric field generated between the second sub-pixel electrode 191b and the common electrode 270.

Since the first sub-pixel electrode 191a is disposed on the second portion 182 of the passivation layer 180, which is thicker than the first portion 181 of the passivation layer 180, the electric field generated between the first sub-pixel electrode 191a and the common electrode 270 is stronger than the electric field generated between the second sub-pixel electrode 191b and the common electrode 270. Consequently, the liquid crystal molecules 31 positioned between the first sub-pixel electrode 191a and the common electrode 270 are tilted before tilting the liquid crystal molecules 31 positioned between the second sub-pixel electrode 191b and the common electrode 270.

The liquid crystal molecules 31 positioned between the first sub-pixel electrode 191a and the common electrode 270 are tilted in the directions in which the first branch electrodes 194 of the first sub-pixel electrode 191a extend by a fringe field caused by the plurality of first branch electrodes 194 of the first sub-pixel electrode 191a and the common electrode 270. For example, in the case of FIG. 1, the liquid crystal molecules would be tilted in the four directions in which the first branch electrodes 194 extend. Likewise, the liquid crystal molecules 31 positioned between the second sub-pixel electrode 191b and the common electrode 270 are tilted in the same directions in which the liquid crystal molecules 31 positioned between the first sub-pixel electrode 191a and the common electrode 270 are tilted.

Referring to FIG. 7, after generating the electric field in the liquid crystal layer 3, a light (e.g., ultraviolet rays, or the like) is irradiated on the liquid crystal layer to polymerize the prepolymer 330, thereby forming a polymer 370. The polymer 370 is formed so as to be in contact with the first and second display panels 100 and 200. The polymer 370 enables the liquid crystal molecules 31 to have defined alignment directions, including pre-tilt angles in the above-mentioned directions. Therefore, even when no voltage is applied to the pixel electrode 191 and the common electrode 270 to generate an electric field, the liquid crystal molecules 31 are aligned with pre-tilt angles in the four different directions.

Figure 8:
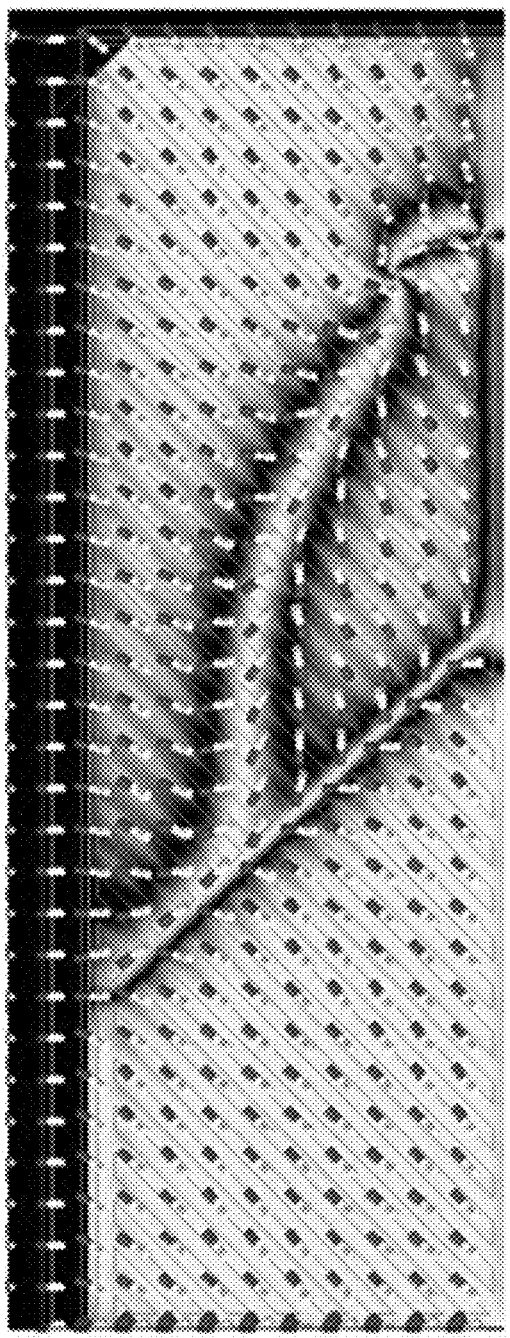
FIG. 8 is a photomicrograph illustrating a change in transmittance of a liquid crystal display according to an exemplary embodiment of the present system and method.
Figure 9:
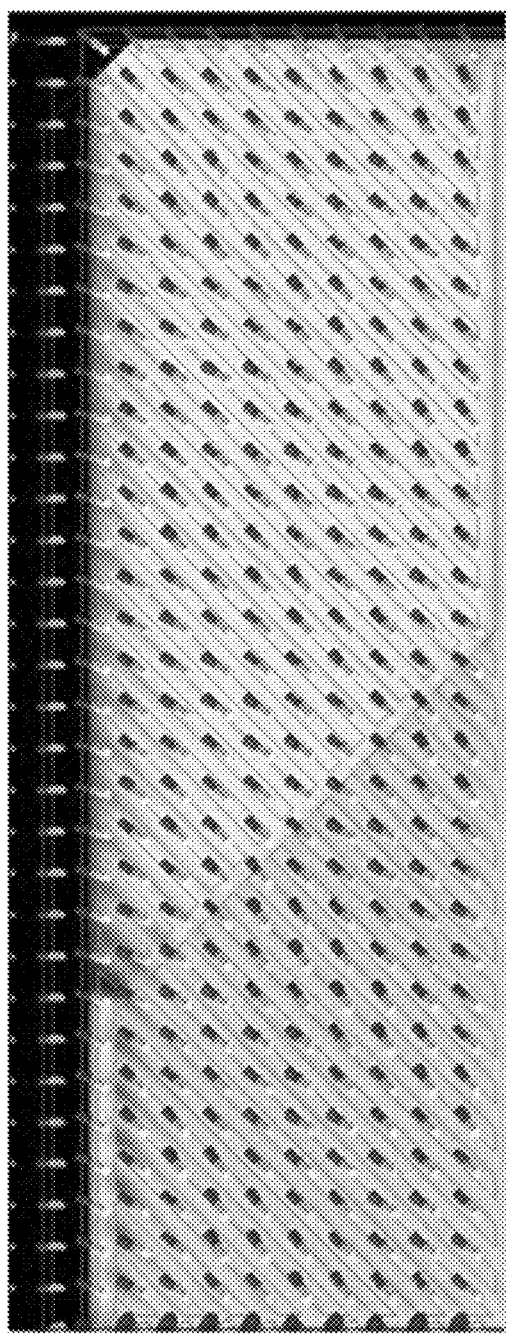
FIG. 9 is a photomicrograph illustrating a change in the transmittance of a liquid crystal display according to an exemplary embodiment of the present system and method.

Next, results of experiments conducted with exemplary embodiments of the present system and method are described with reference to FIG. 8 and FIG. 9. FIG. 8 is a photomicrograph illustrating a change in transmittance of a liquid crystal display according to one exemplary embodiment. FIG. 9 is a photomicrograph illustrating a change in the transmittance of a liquid crystal display according to another exemplary embodiment of the present system and method.

Referring to FIG. 8, the first sub-pixel electrode 191a and the second sub-pixel electrode 191b are applied with the same voltage so that the liquid crystal molecules have pre-tilt angles, and the distance d2 between the first sub-pixel electrode 191a and the second sub-pixel electrode 191b is formed to be 3.0 μm, as shown in FIG. 1. In this case, the passivation layer 180 has a structure without having a step (i.e., d1=0, see FIG. 3).

Referring to FIG. 9, the first sub-pixel electrode 191a and the second sub-pixel electrode 191b are applied with the same voltage so that the liquid crystal molecules have pre-tilt angles, and the distance d2 between the first sub-pixel electrode 191a and the second sub-pixel electrode 191b is formed to be 3.0 μm, as shown in FIG. 1. In this case, the passivation layer 180 has a structure having a step of 5000 Å (i.e., d1=5000 Å). That is, the passivation layer 180 includes the first portion 181 and the second portion 182 that is thicker than the first portion 181 by 5000A. The first sub-pixel electrode 191a is disposed on the second portion 182 of the passivation layer 180, and the second sub-pixel electrode 191b is disposed on the first portion 181 of the passivation layer 180.

Referring to FIG. 8, an aperture ratio is degraded due to texturing in the pixel region. Referring to FIG. 9, the aperture ratio is not degraded since the liquid crystal molecules positioned in the first sub-pixel electrode 191a and the second sub-pixel electrode 191b are tilted in the same direction, and texturing do not occur in the pixel region.

That is, by forming the step in the passivation layer 180 such that the second portion 182 in which the first sub-pixel electrode 191a is disposed is thicker than the first portion 181 in which the second sub-pixel electrode 191b is disposed, and applying the same voltage to the first sub-pixel electrode 191a and the second sub-pixel electrode 191b upon the initial alignment so that the liquid crystal molecules have pre-tilt angles, the aperture ratio does not decrease.

While the present system and method are described in connection with exemplary embodiments, the present system and method are not limited to the disclosed embodiments. On the contrary, those of ordinary skill would recognize that the present system and method encompass various modifications and equivalent arrangements.

DESCRIPTION OF SYMBOLS

| | |
|---|---|
| 3: liquid crystal layer | 31: liquid crystal molecule |
| 121: gate line | 131: reference voltage line |
| 154a, 154b, 154c: first, second, third semiconductor | |
| 171: data line | 180: passivation layer |
| 181: first portion | 182: second portion |
| 191a: first sub-pixel electrode | 191b: second sub-pixel electrode |
| 194: first branch electrode | 196: second branch electrode |
| 270: common electrode | |

The invention claimed is:

1. A liquid crystal display, comprising:
a first substrate;
a thin film transistor disposed on the first substrate;
a passivation layer disposed on the thin film transistor and including a first portion and a second portion thicker than the first portion;
a first sub-pixel electrode and a second sub-pixel electrode disposed on the passivation layer, not directly connected to each other, and positioned on one pixel region;
a second substrate facing the first substrate; and
a liquid crystal layer positioned between the first substrate and the second substrate,
wherein the first sub-pixel electrode is disposed on the second portion of the passivation layer, and the second sub-pixel electrode is disposed on the first portion of the passivation layer,
wherein the first sub-pixel electrode has an overall polygonal shape of a hexagon, and the second sub-pixel electrode has an overall shape in which four parallelograms are clustered.

2. The liquid crystal display of claim 1, wherein the second portion of the passivation layer is thicker than the first portion of the passivation layer by 5000 Å to 10000 Å.

3. A liquid crystal display, comprising:
a first substrate;
a thin film transistor disposed on the first substrate;
a passivation layer disposed on the thin film transistor and including a first portion and a second portion thicker than the first portion;
a first sub-pixel electrode and a second sub-pixel electrode disposed on the passivation layer, spaced apart from each other, and positioned on one pixel region;
a second substrate facing the first substrate; and
a liquid crystal layer positioned between the first substrate and the second substrate,
wherein the first sub-pixel electrode is disposed on the second portion of the passivation layer, and the second sub-pixel electrode is disposed on the first portion of the passivation layer, and
wherein the second portion of the passivation layer has an overall polygonal shape of a hexagon, and
the first portion of the passivation layer surrounds the second portion of the passivation layer.

4. The liquid crystal display of claim 1, wherein the first sub-pixel electrode includes a plurality of first branch electrodes, the second sub-pixel electrode includes a plurality of second branch electrodes, and the second sub-pixel electrode is positioned at a border of the pixel region so as to surround the first sub-pixel electrode.

5. The liquid crystal display of claim 4, wherein the first sub-pixel electrode and the second sub-pixel electrode are spaced apart a distance of 3 µm to 4 µm.

6. The liquid crystal display of claim 5, wherein the distance between the first sub-pixel electrode and the second sub-pixel electrode is 3.0 µm, and
a ratio of the voltage applied to the second sub-pixel electrode to the voltage applied to the first sub-pixel electrode is 0.9 or less.

7. The liquid crystal display of claim 5, wherein the distance between the first sub-pixel electrode and the second sub-pixel electrode is 4.0 µm, and
a ratio of the voltage applied to the second sub-pixel electrode to the voltage applied to the first sub-pixel electrode is 0.8 or less.

8. The liquid crystal display of claim 5, wherein the first sub-pixel electrode further includes a cross stem portion including a horizontal stem portion and a vertical stem portion, and
the plurality of first branch electrodes extends in four different directions from the cross stem portion.

9. The liquid crystal display of claim 8, wherein the second sub-pixel electrode further includes a border stem portion positioned at a border of the pixel region, and
the plurality of second branch electrodes extends in four different directions from the border stem portion.

10. The liquid crystal display of claim 1, further comprising a common electrode disposed on the second substrate.

* * * * *